Oct. 9, 1945.  E. L. S. BORG  2,386,652

SHEARING AND PUNCHING MACHINE FOR SHEET METAL

Filed March 9, 1944

Inventor
Ernst Linus Sigfrid Borg
By *[signature]*
Attorneys

Patented Oct. 9, 1945

2,386,652

UNITED STATES PATENT OFFICE 2,386,652

SHEARING AND PUNCHING MACHINE FOR SHEET METAL

Ernst Linus Sigfrid Borg, Gothenburg, Sweden, assignor to Fabriksaktiebolaget Haldataxametern, Holmstad, Sweden, a company of Sweden Application March 9, 1944, Serial No. 525,738
In Sweden April 19, 1943

7 Claims. (Cl. 164—58)

The present invention refers to sheet metal shearing machines, punching and similar machines provided with two tools adapted to be moved against one another, and the invention has for its object to provide an arrangement wherein one of the tools may be adjusted sideways relatively to the other tool with great accuracy and in a convenient manner. The invention is principally distinguished by the feature that one tool, preferably the stationary one, is adjustable laterally in relation to the other tool by means of a wedge member bearing on the side of the tool and preferably adapted to be adjusted in the longitudinal direction of the tool. An eccentric, cam disk or the like is preferably used for the adjustment of the wedge member.

Figure 1:
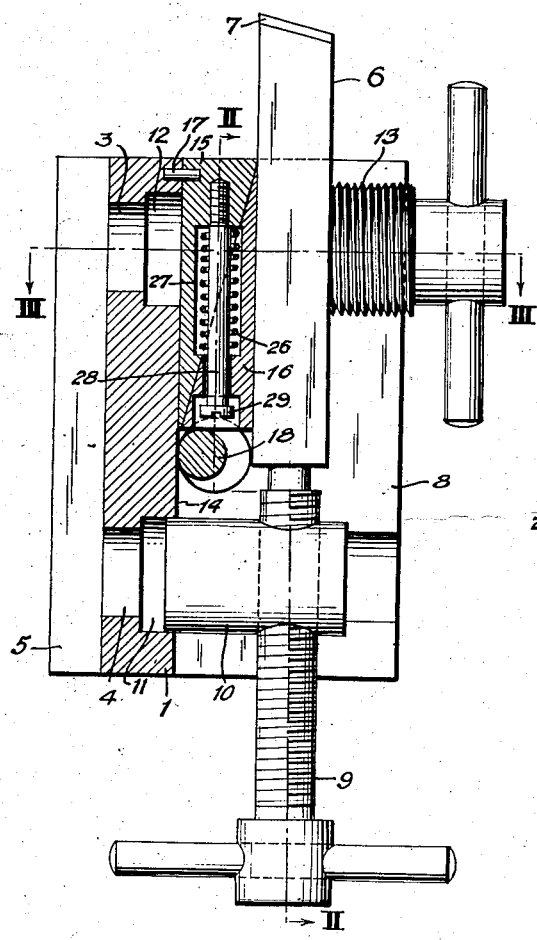
Figure 2:
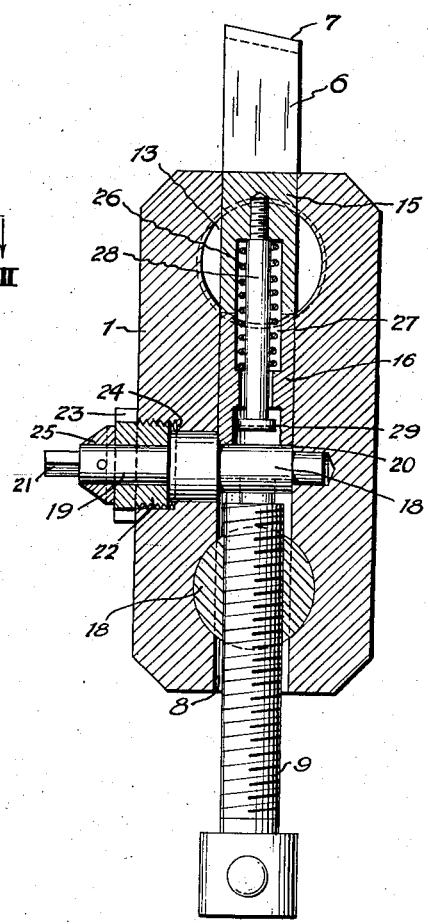
Figure 3:
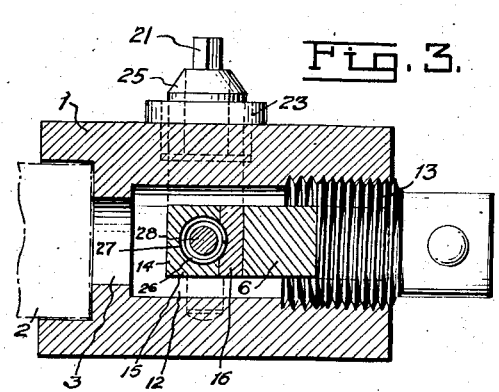

The invention will be described more closely hereinafter with reference to the accompanying drawing which illustrates a form of embodiment of a tool holder for a shearing machine for sheet metal. Figure 1 shows a vertical section through the tool holder, and Figure 2 is a section on line II—II in Figure 1. Figure 3 shows a horizontal section on line III—III in Figure 1.

The drawing represents the stationary tool holder, which consists of a parallelepipedic block 1 adapted to be secured to the frame member 2 shown by chain-dotted lines in Figure 3, such securing being effected with the aid of screw bolts extending through holes 3, 4 in the tool holder. The frame member 2 fits accurately into a longitudinally extending milled-out recess 5 in the rear portion of the tool holder.

The tool, which in the example shown consists of a parallelepipedic cutter 6 with a cutting edge 7 coacts with another parallelepipedic cutter (not shown) arranged above the first mentioned cutter 6 and moved against it while the cutter 6 is adjustably arranged in a milled-out recess in the block 1 in the form of a slot 8 which is open toward the one side thereof as well as at the top and at the bottom. The plane lower end of the cutter 6 abuts against the plane upper end of a set screw 9 which is threaded through a cylindrical block 10, which is inserted into a corresponding cylindrical bore 11 in the tool holder opposite the lower hole 4. The level of the tool may be adjusted by means of the set screw 9. Provided opposite the upper hole 3 is a corresponding bore 12 with internal threads at the outer end thereof, a clamping screw 13 being threaded into said bore. The clamping screw 13 serves to fix the tool immovably in its laterally adjusted position.

To render possible an accurate adjustment of the tool in a lateral direction, there is inserted, according to the invention, a parallelepipedic block between the tool and the bottom of the recess 8, said block consisting of two wedge members 15, 16 bearing on each other with the oblique surfaces thereof. The wedge member 15 is removably held against the bottom 14 of said recess 8 by means of a pin 17. The lower wedge member 16 bears with its lower plane end against a pin 18, which is eccentrically arranged on a transverse bolt 19 rotatably mounted in the block 1. The pin 18 is of a width corresponding to the width of the recess 8, and is provided on one side thereof with a shoulder 20, by means of which the bolt 19 bears against the one side wall of the recess 8. By means of a key or the like, which is applied to the square end 21 of the bolt 19, the eccentric 18 and thus the wedge member 16 may be adjusted into the desired position, whereupon the eccentric is fixed in the adjusted position by the tightening of a clamping screw 22, which consists of a sleeve thrust onto the bolt 19, said sleeve being threaded into the block and provided with a head 23 adapted to receive a tool for the tightening of the clamping screw. The clamping screw 22 bears with its inner end against a shoulder 24 on the bolt 19, through which shoulder an axial pressure is transferred to the bearing surface of the shoulder on the side wall of the recess 8, so that the eccentric will be locked in its adjusted position. The clamping screw 22 is retained in its place on the bolt 19 by means of a stop ring 25.

When the wedge member 16 is adjusted in its longitudinal direction by means of the eccentric 18, the wedge member will at the same time be moved laterally, while the tool is kept bearing on the outer plane surface of the wedge member. The tool may then slide with its lower plane end on the upper end of the set screw 9. After the tool has been adjusted in this manner into the proper lateral position relatively to the other tool—not shown in the drawing—cooperating therewith, the tool is locked in the position thus adjusted by means of the clamping screw 13 bearing on the outer side of the tool with the plane end thereof.

To facilitate adjustment, the wedge member 16 is arranged to be actuated by a compression spring 26 provided within a cylindrical recess 27 extending into each of the wedge members 15, 16. The spring 26 bearing with one end thereof against the wedge member 15 and with the other end thereof against the wedge member 16, tends to displace the lower wedge member 16 toward the eccentric 18, so that the wedge member 16 will accurately follow the movement of the eccentric. To prevent the wedge member 16 from falling out when the tool 6 is removed, the two wedge members are united with one another by means of a bolt 28, which is screwed with the one end thereof into the wedge member 15, and which is provided with a head 29 forming a stop abutment for the wedge member 16. The spring 26 surrounds the bolt 28.

As mentioned above the cutter 6 is adapted to cooperate with a cutter of a similar shape movably arranged in the upper part of the frame of the shearing machine and driven by a motor so as to carry out a reciprocating movement in the longitudinal direction of the cutter 6, the cutting edge 7 then coacting with the corresponding cutting edge of the upper cutter for cutting a piece of sheet metal introduced between the cutters, while being moved in a direction perpendicular to the longitudinal direction of the cutters and substantially in a manner known in the art for instance by the U. S. Patent No. 2,182,162. Said patent shows fully the cooperation of the cutters as well as the operating mechanism, the cutters themselves being of a parallelepipedical form and similar to those above described with the difference only that the cutting edges are formed in the shape of a chisel whereas in the present case the cutting edges constitute the edge between a longitudinal surface and an oblique transverse end surface of the parallelepipedic cutter stem.

As will be readily seen, the invention may be applied in a similar manner to punching machines, for example to adjust the die relatively to the punch.

I claim:

1. A tool holder for the stationary tool of sheet metal shearing machines and the like, provided with a stationary and a movable tool including means for effecting adjustment of the stationary tool sideways relatively to the movable tool in the form of a wedge member bearing on the side of the stationary tool and adjustable in the direction of movement of the movable tool.

2. A tool holder as claimed in claim 1, in which an eccentric member is provided for effecting adjustment of the wedge member, said eccentric member acting upon the end of the wedge member.

3. A tool holder as claimed in claim 1, in which an eccentric member in the form of a cam disc is provided for adjusting the stationary tool by acting upon the end of the wedge member and a clamping screw for locking the eccentric member in the desired position of adjustment.

4. A tool holder as claimed in claim 1, in which the wedge member constitutes the one part of a parallelepipedic block composed of said wedge member and a second wedge member, said block being inserted between the tool and a supporting surface in the tool holder.

5. A tool holder as claimed in claim 1, in which the wedge member of which constitutes the one part of a parallelepipedic block composed of said wedge member and a second wedge member, said members having aligning recesses therein, said block being inserted between the tool and a supporting surface in the tool holder, and means for displacing the first wedge member on the second wedge member in the form of a compression spring inserted into the recesses in the block formed by the two wedge members.

6. A tool holder as claimed in claim 1, in which the wedge member constitutes the one part of a parallelepipedic block composed of said wedge member and a second wedge member, said block being inserted between the tool and a supporting surface in the tool holder, (and means for uniting) the two wedge members with each other in the form of a bolt secured in the first wedge member and extending in the longitudinal direction through the second wedge member.

7. A tool holder as claimed in claim 1, in which the wedge member constitutes the one part of a parallelepipedic block composed of said wedge member and a second wedge member, said members having aligning recesses therein, said block being inserted between the tool and a supporting surface in the tool holder, means for displacing the first wedge member on the second wedge member in the form of a compression spring inserted into the recesses in the block formed by the two wedge members, means for uniting the two wedge members, the two with each other in the form of a bolt secured in the first wedge and extending in the longitudinal direction through the second wedge, and the compression spring consisting of a helical spring surrounding the bolt uniting the two wedges.

ERNST LINUS SIGFRID BORG.